(12) United States Patent
Kim et al.

(10) Patent No.: US 9,732,543 B2
(45) Date of Patent: Aug. 15, 2017

(54) DOOR INTERLOCK DEVICE FOR TRANSFORMER ROOM OF VACUUM CIRCUIT BREAKER

(71) Applicant: LSIS CO., LTD., Anyang-si, Gyeonggi-do (KR)

(72) Inventors: Jong Doo Kim, Cheongju-si (KR); Kil Young Ahn, Daejeon (KR); Seung Pil Yang, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 282 days.

(21) Appl. No.: 14/477,326

(22) Filed: Sep. 4, 2014

(65) Prior Publication Data

US 2015/0102608 A1  Apr. 16, 2015

(30) Foreign Application Priority Data

Oct. 16, 2013  (KR) .................. 10-2013-0123523

(51) Int. Cl.
*E05C 1/06* (2006.01)
*E05B 65/00* (2006.01)
(Continued)

(52) U.S. Cl.
CPC .............. *E05B 65/00* (2013.01); *H01H 9/22* (2013.01); *H01H 31/06* (2013.01);
(Continued)

(58) Field of Classification Search
CPC ............. E05B 65/0017; E05B 65/0042; E05B 65/005; E05B 65/0075; E05B 65/00;
(Continued)

(56) References Cited

U.S. PATENT DOCUMENTS 2,670,932 A * 3/1954 Westerfors ............. A47D 13/06
220/327
4,257,193 A * 3/1981 Williams ............ E02D 29/1427
292/173
(Continued)

FOREIGN PATENT DOCUMENTS

CN         2736902 Y  * 10/2005
CN        201126767     10/2008
(Continued)

OTHER PUBLICATIONS

Korean Intellectual Property Office Application Serial No. 10-2013-0123523, Office Action dated Feb. 17, 2015, 4 pages.
(Continued)

*Primary Examiner* — Mark Williams
(74) *Attorney, Agent, or Firm* — Lee, Hong, Degerman, Kang & Waimey

(57) ABSTRACT

A door interlock device for a power transformer room in a vacuum circuit breaker includes a cam disposed on a shaft of a ground switch, a supporter disposed on a side plate of a power transformer room, a shaft disposed at the supporter to be slidable and having one end contacting the cam to be upward and downward movable, a spring disposed within the supporter to provide an upward elastic force to the shaft, and an interlock plate disposed at one side of the power transformer room door and configured to be in contact with the shaft.

3 Claims, 8 Drawing Sheets

(51) Int. Cl.
*H01H 9/22* (2006.01)
*H01H 31/06* (2006.01)
*H02B 11/133* (2006.01)
*H02B 11/28* (2006.01)

(52) U.S. Cl.
CPC ............ *H02B 11/133* (2013.01); *H02B 11/28* (2013.01); *Y10T 292/1016* (2015.04)

(58) Field of Classification Search
CPC .... Y10S 292/65; Y10S 292/11; Y10S 292/25; Y10T 292/096; Y10T 292/0977; Y10T 292/1016; Y10T 292/0971; Y10T 292/0974; Y10T 292/0994; Y10T 292/1015; Y10T 292/1014; Y10T 292/097; Y10T 292/102; Y10T 292/68; Y10T 292/696; H01H 9/22; H01H 31/06; H02B 11/133; H02B 11/28
USPC ........ 292/137, 169, 140, DIG. 65, 165, 167, 292/173, 139, 138, 164, 143, 340, 341.15, 292/DIG. 11, DIG. 25; 361/607, 609, 615
See application file for complete search history.

(56) References Cited

U.S. PATENT DOCUMENTS

| | | | | |
|---|---|---|---|---|
| 4,922,817 A | * | 5/1990 | Holodnak | ........ G07B 17/00193 |
| | | | | 101/91 |
| 7,229,106 B2 | * | 6/2007 | Bassett | ................... E05B 65/46 |
| | | | | 292/207 |
| 2007/0273159 A1 | * | 11/2007 | Rouyer | ................... F02K 1/766 |
| | | | | 292/201 |

FOREIGN PATENT DOCUMENTS

| | | | | | |
|---|---|---|---|---|---|
| CN | 201196926 | | 2/2009 | | |
| CN | 101558537 | | 10/2009 | | |
| CN | 101558537 A | * | 10/2009 | .......... | H02B 11/133 |
| CN | 102290727 | | 12/2011 | | |
| CN | 103247467 A | * | 8/2013 | | |
| JP | 2010-251160 | | 11/2010 | | |
| KR | 20020035675 A | * | 5/2002 | | |
| KR | 10-1033536 | | 5/2011 | | |
| KR | 101168083 B1 | * | 7/2012 | .......... | H02B 11/133 |
| WO | 2008/087723 | | 7/2008 | | |
| WO | 2013/084572 | | 6/2013 | | |
| WO | 2013/097175 | | 7/2013 | | |

OTHER PUBLICATIONS

European Patent Office Application Serial No. 14188246.4, Search Report dated Feb. 18, 2015, 8 pages.

The State Intellectual Property Office of the People's Republic of China Application Serial No. 201410549829.7, Office Action dated Mar. 28, 2016, 7 pages.

\* cited by examiner

DOOR INTERLOCK DEVICE FOR TRANSFORMER ROOM OF VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2013-0123523, filed on Oct. 16, 2013, the contents of which are all hereby incorporated by reference herein in its entirety.

BACKGROUND OF THE INVENTION

1. Field of the Invention

The present invention relates to a door interlock device for a transformer room of a vacuum circuit breaker, more particularly, to a door interlock device for a transformer room of a vacuum circuit breaker which is structured such that a door of a transformer room is opened by a user only when a ground switch is in a closed state.

2. Description of the Conventional Art

In general, a vacuum circuit breaker is provided in a distribution board for operation or control of a power line system and an operation of a motor in a power plant or a substation, together with other various electric equipment. Further, the vacuum circuit breaker is usually disposed within a cradle which is fixed to the distribution board, in an insertable and drawable manner.

In the distribution board, there are a running (operation) position where a main line and a load terminal of a vacuum circuit breaker are connected to a main line and a load terminal of a cradle to supply a voltage and a current, and a test position where the main line and the load terminal of the vacuum circuit breaker are separated from the main line and the load terminal of the cradle so that an inspection of an operation state of the vacuum circuit breaker can be performed. When the circuit breaker is in the running position, the circuit breaker is operated in case of a fault current such as a short circuit and a ground fault to prevent an incidental accident. On the other hand, when the circuit breaker is in the test position where the circuit is not operated, it is indispensible to provide an additional ground switch at a rear side of the distribution board in order to secure human and physical safety.

Meanwhile, at a lower portion of the cradle, a power transformer is disposed within an instrumental power transformer room. Similarly to the circuit breaker, the power transformer also has a running position where the power transform is performed by being connected to the load terminal, and a test position for maintenance and repair.

When the power transformer is damaged or a power fuse is broken by a trouble which is generated in the running procedure so that maintenance and repair is required, a user can be protected from danger in a case where the maintenance and repairing is performed in a ground state of the circuit breaker. That is, when a user unintentionally opens the door of the transformer room for maintenance and repair, the user may be exposed to danger such as a high voltage, thereby resulting in an accident.

FIGS. 1 and 2 illustrate a switch box in accordance with the conventional art, in which FIG. 1 is a perspective view illustrating a switch box in accordance with the conventional art, and FIG. 2 is a perspective view illustrating the switch box of FIG. 1 in which a ground switch is closed in a state where electric equipment in a distribution board has been excluded.

The structure and operation of the switch box in accordance with the conventional art will be described with reference to FIGS. 1 and 2.

The switch box 1 may be divided into an upper part and a lower part. In the upper part of the switch box 1, a circuit breaker room 6 (CB Room) in which a circuit breaker 2 is accommodated, is provided and at the rear part thereof, a ground switch 3 is disposed. At the lower part of the switch box 1, there is provided a power transformer room 7 (PT Room) which is opened and closed by a power transformer room door 5 and a PT truck 4 is accommodated therein. A power transformer 8 is accommodated in the power transformer room 7 in a disposed state on the PT truck 4, and a power fuse 9 may be disposed at the upper portion of the power transformer 8.

As shown in FIG. 2, it can be noted that the door 5 may be opened in a state where the ground switch 3 is closed.

In a case where repairing work is required when the power fuse 9 is broken due to a fault current, the repairing work is performed by drawing out the PT truck 4 after opening the door 5.

According to the conventional art, as shown in FIG. 2, the transformer room door 5 may be opened irrespective of the closing or opening position of the ground switch 3. Thus, even though the circuit breaker 2 is moved to a test position due to a fault current, a residual voltage may remain at the power transformer room 7 and the load terminal. Accordingly, it is necessary to perform the maintenance and repairing work after removing the residual voltage by closing the ground switch 3 to secure safety of a user and equipment. However, when the power transformer room door 5 is opened in a case where the ground switch 3 is not closed, there may be a serious problem in that a user may be placed into a dangerous situation due to the residual voltage remaining within the power transformer room 7.

SUMMARY OF THE INVENTION

An object of the present invention is to provide a door interlock device for a power transformer room of a circuit breaker, which is capable of securing the safety of a user by providing a door to be opened only in a ground condition.

To achieve these and other advantages and in accordance with the purpose of this specification, as embodied and broadly described herein, there is provided a door interlock device for a power transformer room, in a switch box wherein a circuit breaker room and a power transformer room are provided and wherein a ground switch of the circuit breaker room is disposed to be movable to an opening position and a closing position, the door interlock device including a cam disposed on a driving shaft of the ground switch; a supporter disposed on a side plate of the power transformer room; a shaft disposed at the supporter to be slidable and having one end contacting the cam to be upward and downward movable; a spring disposed within the supporter to provide an upward elastic force to the shaft; and an interlock plate disposed at one side of the power transformer room door and configured to contact the shaft, wherein the transformer room door is not allowed to move when the interlock plate is restricted by the shaft, but the power transformer room door is allowed to move, when the interlock plate is released from the restriction of the shaft.

A contact plate may be provided at one end of the shaft in a direction perpendicular to an axial direction so as to be in contact with the cam.

The cam may include a flat portion and a protrusion portion, wherein the protrusion portion is in contact with the shaft only when the ground switch is in a ground position.

The shaft may include a circumferential groove at a central portion thereof.

The shaft may include a fixing member at another end thereof to fix the shaft to the supporter.

The interlock plate may include a hooking recess to be engaged with the shaft.

The hooking recess may include a hooking portion having a width equal to or larger than a diameter of the shaft and an inlet portion having a width smaller than that of the hooking portion.

The width of the inlet portion of the hooking recess may be larger than a diameter of the circumferential groove but smaller than a diameter of the shaft.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE PREFERRED EMBODIMENT

Hereinafter, a preferred embodiment of a door interlock device for a power transformer room in accordance with an embodiment of the present invention will now be described in detail with reference to the accompanying drawings.

Figure 1:
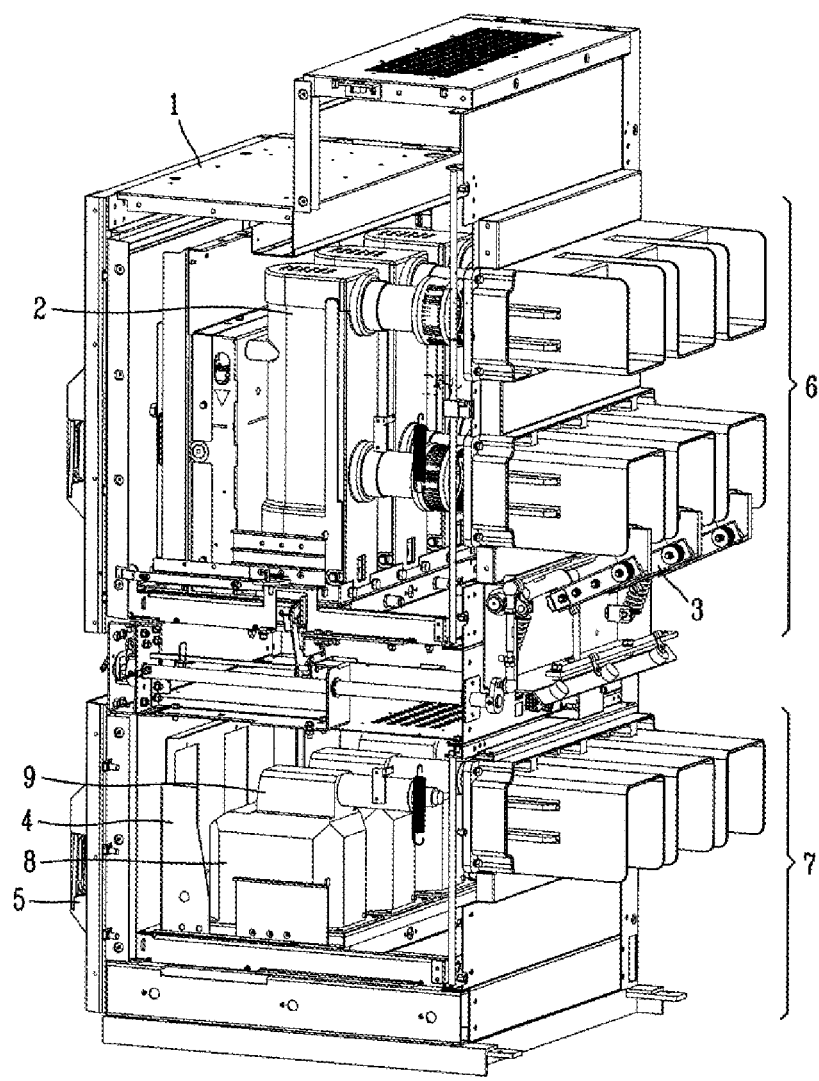
FIG. 1 is a perspective view illustrating a switch box in accordance with the conventional art.
Figure 2:
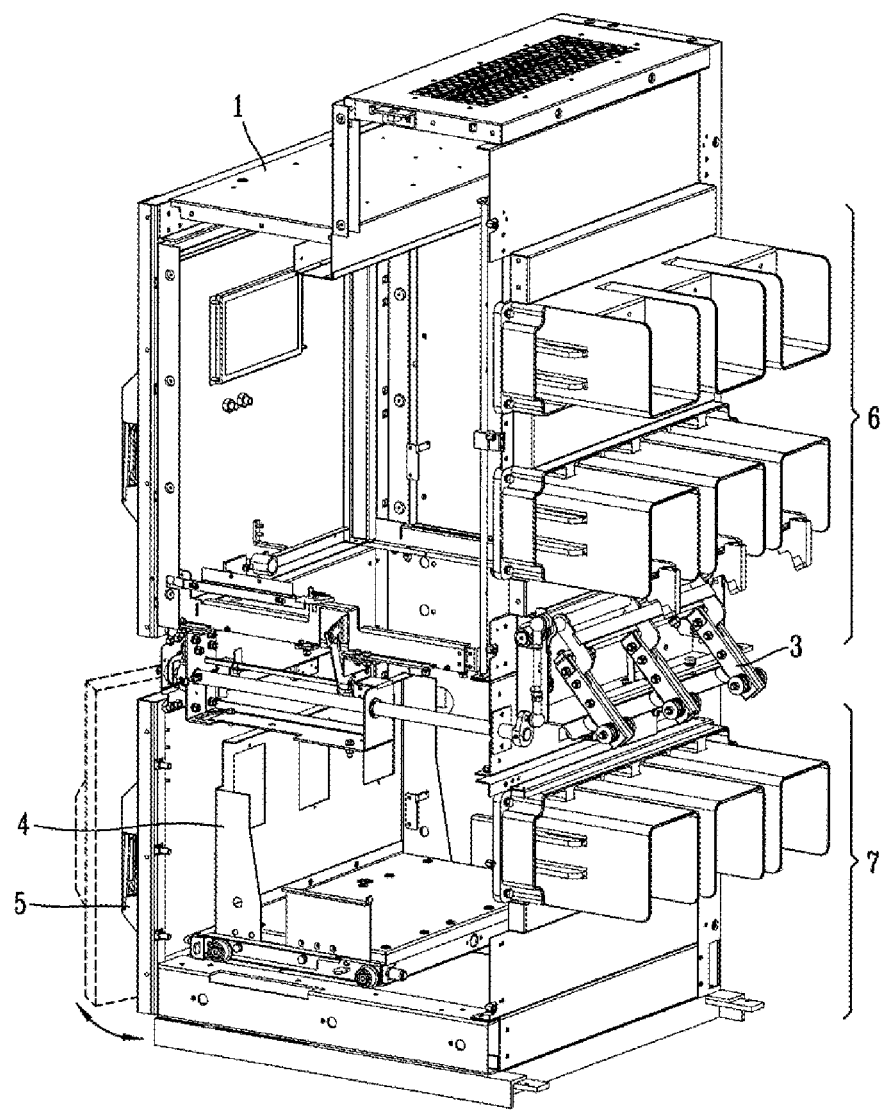
FIG. 2 is a perspective view illustrating that a ground switch of FIG. 1 in a closed in a state.
Figure 3:
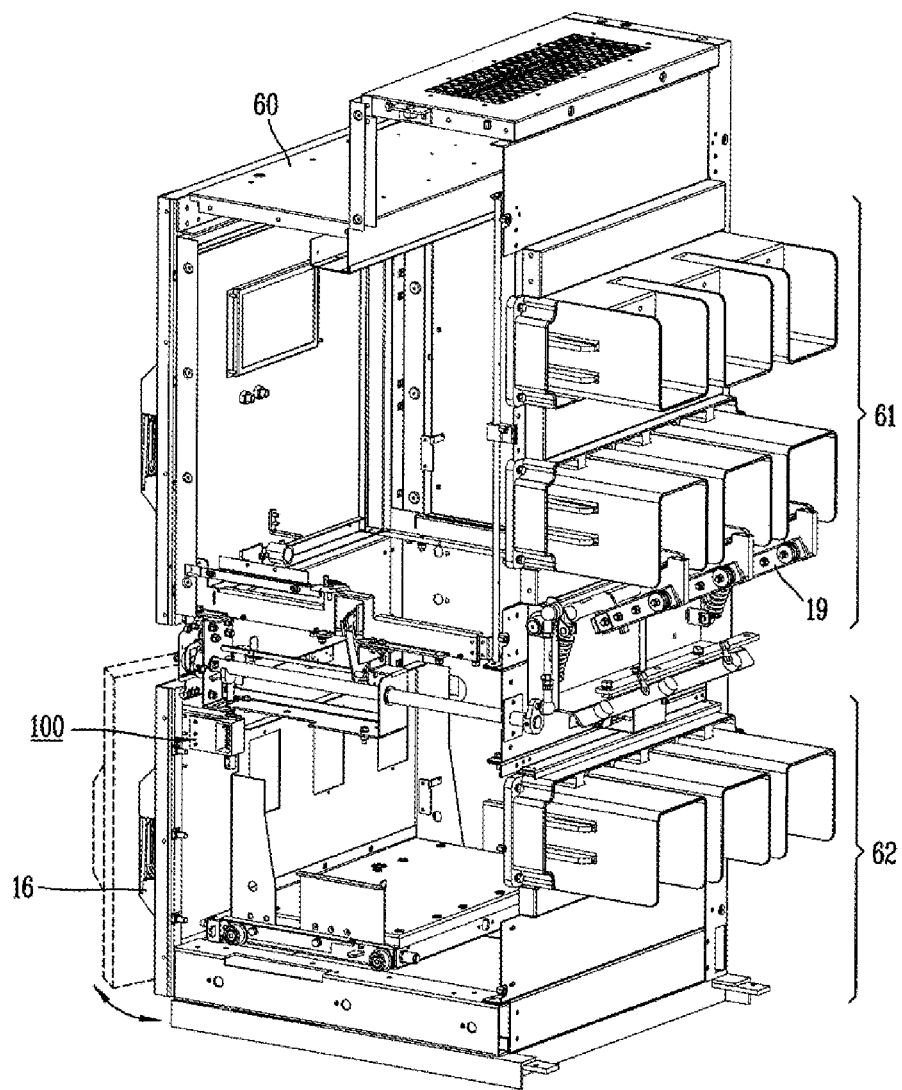
FIG. 3 is a perspective view illustrating a switch box to which a door interlock device for a power transformer room in accordance with an embodiment of the present invention has been applied.
Figure 4:
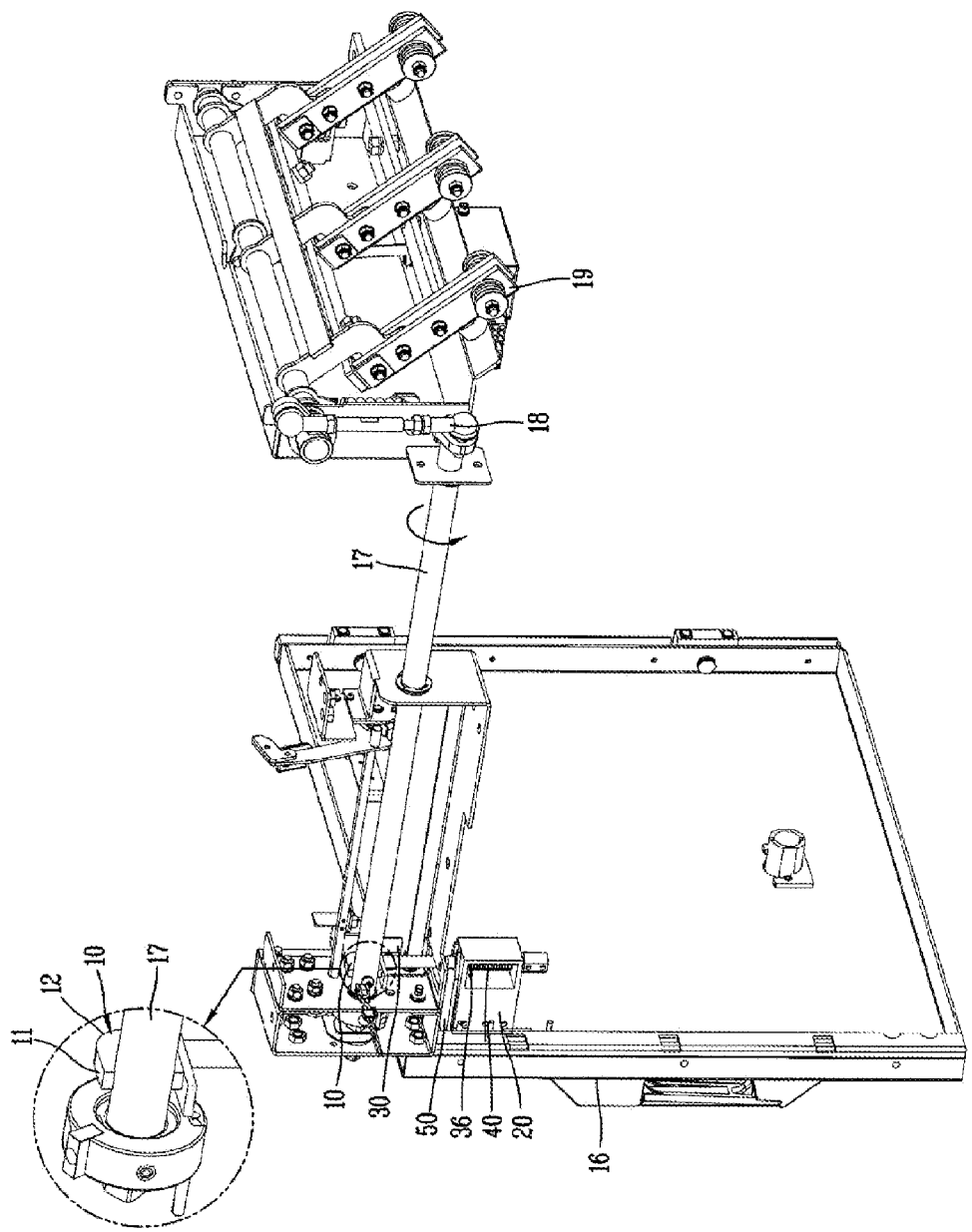
FIG. 4 is a partial perspective view illustrating the switch box of FIG. 3 in which a ground switch is in an open state.
Figure 5:
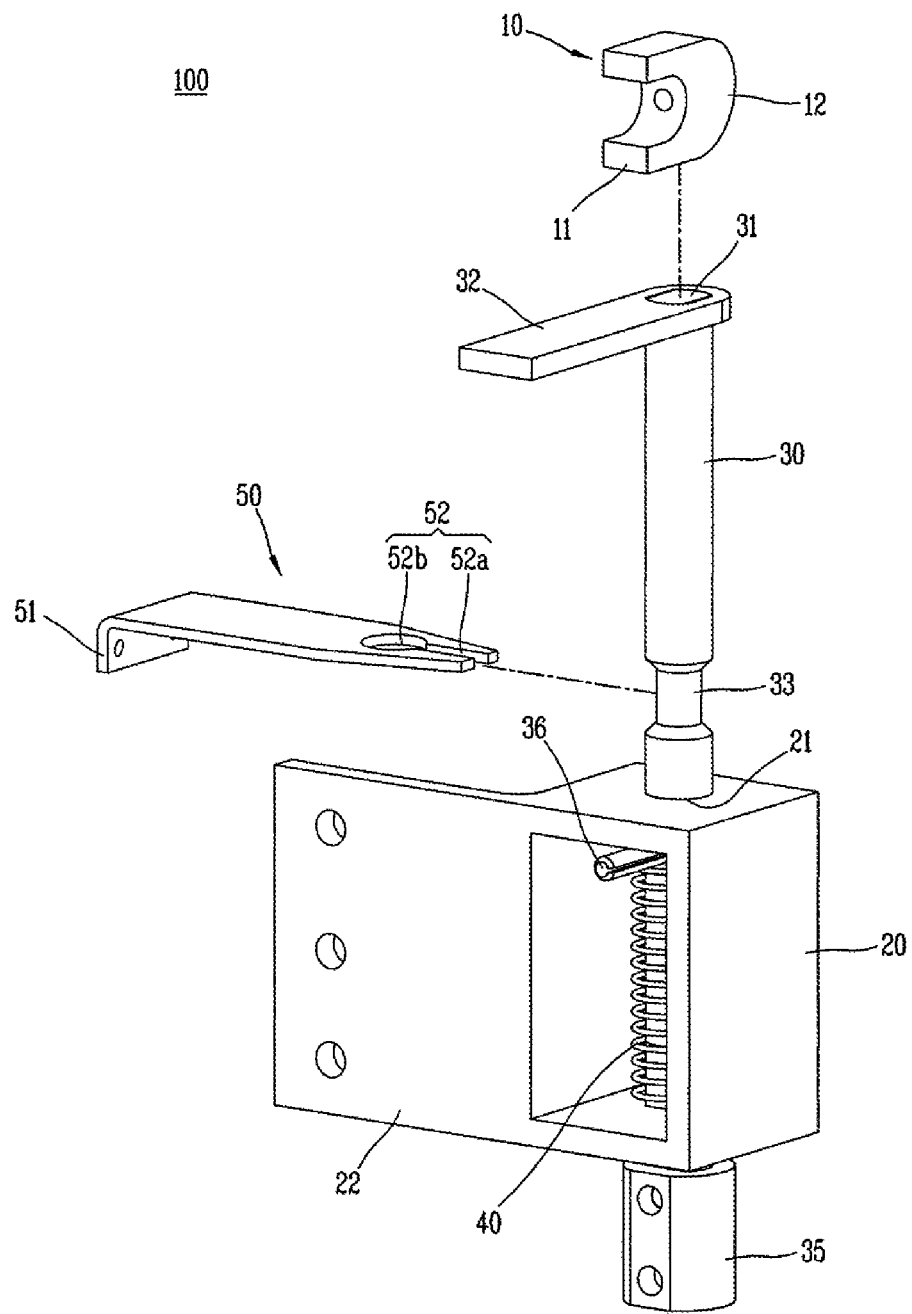
FIG. 5 is a detailed perspective view illustrating an interlock assembly of FIG. 4.
Figure 6:
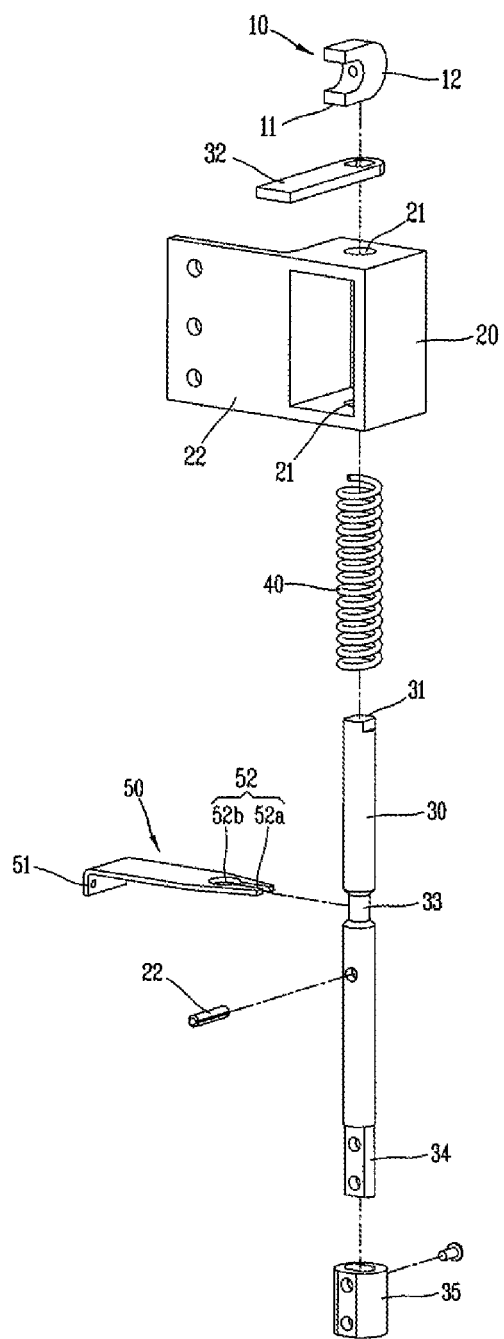
FIG. 6 is a disassembled perspective view of FIG. 5.
Figure 7:
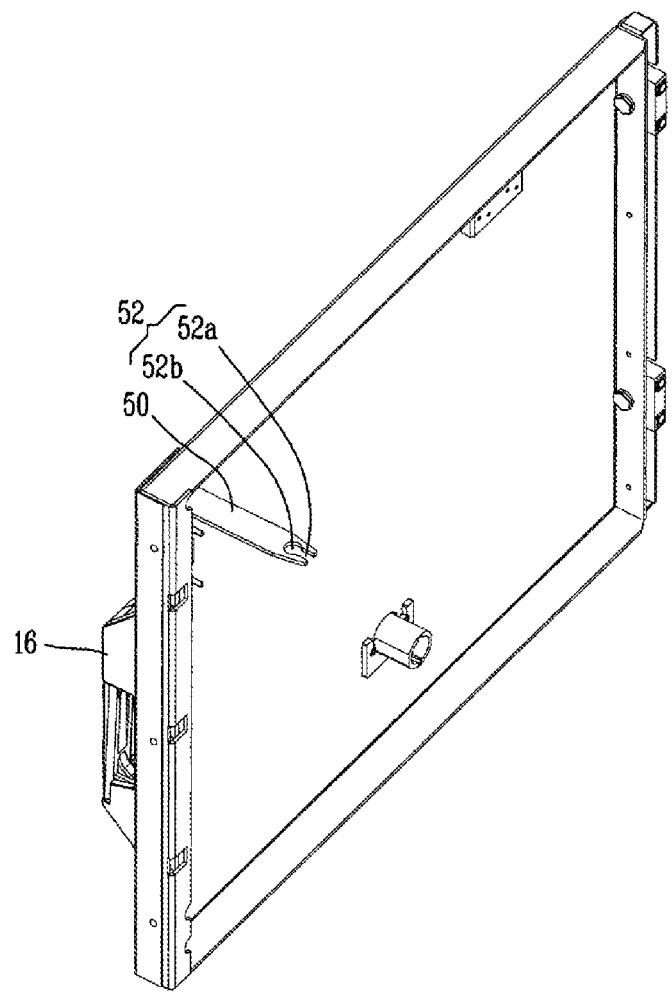
FIG. 7 is a detailed perspective view illustrating a door of FIG. 4.
Figure 8:
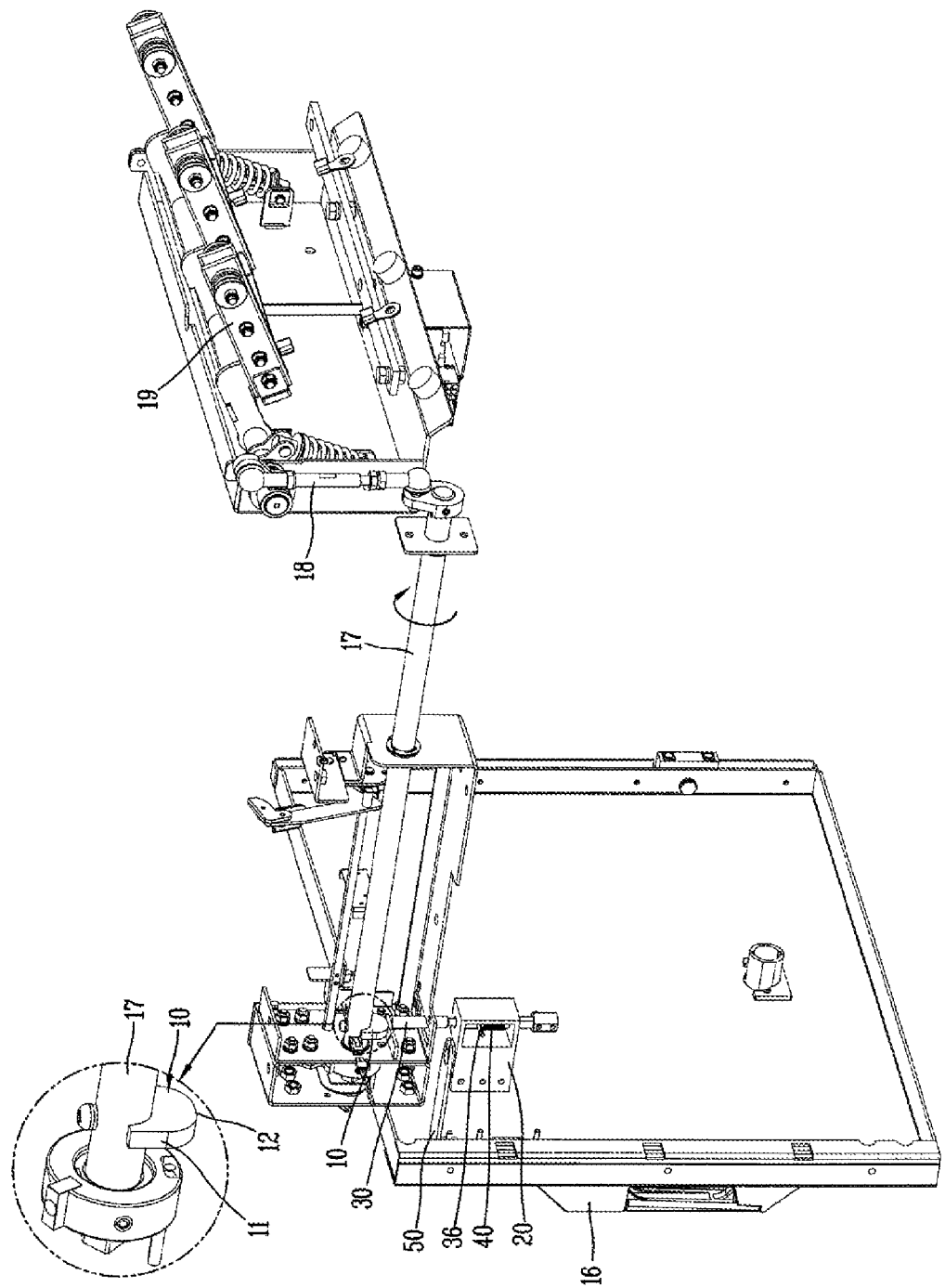
FIG. 8 is a perspective view illustrating the door interlock device for a power transformer room in accordance with an embodiment of the present invention in which the ground switch is in a closed state.

FIG. 4 is a partial perspective view illustrating a switch box of FIG. 3 in which the ground switch is opened, FIG. 5 is a detailed perspective view illustrating an interlock assembly of FIG. 4, FIG. 6 is a disassembled perspective view of FIG. 5, FIG. 7 is a detailed perspective view illustrating the door of FIG. 4, and FIG. 8 is a perspective view illustrating the door interlock device for a power transformer room in accordance with an embodiment of the present invention in which the ground switch is closed.

As shown in the drawings, the door interlock device for a power transformer room in accordance with an embodiment of the present invention includes, in a switch box in which a circuit breaker room and a power transformer room are provided and a ground switch 19 is disposed to be movable to a closing position and an opening position, a cam 10 disposed on a driving shaft 17 of the ground switch 19; a supporter 20 disposed on a side plate of the power transformer room; a shaft 30 disposed at the supporter 20 to be slidable and having one end contacting the cam 10 to be upward and downward movable; a spring 40 disposed within the supporter 20 to provide an upward elastic force to the shaft 30; and an interlock plate 50 disposed at one side of the transformer room door 16 and configured to be in contact with the shaft 30, wherein the transformer room door 16 is not allowed to move when the interlock plate 50 is restricted by the shaft 30, but the power transformer room door 16 is allowed to move when the interlock plate 50 is released from the restriction of the shaft 30.

With reference to the drawings, the door interlock device for a power transformer room in accordance with an embodiment of the present invention will be described.

The ground switch 19 is not closed when the movable contact and the fixed contact are in contact with each other in a conductive state, that is, in an operation state of the circuit breaker, and is provided to prepare against the electric accident such as a ground fault by being closed in a test state where the movable contact and the fixed contact are separated from each other.

In a case where the ground switch 19 is in a closable state, once the driving shaft 17 of the ground switch 19 is rotated by using a manipulation instrument like a handle from outside, the driving force is transmitted to the ground switch 19 through the power transmission mechanism 18 so that the ground switch 19 is rotated to contact a terminal of the cradle, thereby maintaining the ground state.

In order to allow or restrict an open state of the power transformer room door 16 using the rotation of the driving shaft 17 of the ground switch 19, there are provided the cam 10 for changing a rotary motion to a linear motion, the shaft 30 for transmitting the linear motion, the supporter 20 for supporting the shaft 30, and the interlock plate 50 configured to be restricted to or released from the shaft 30.

The cam 10 is provided to change a rotary motion generated by the driving shaft 17 of the ground switch 19 to a rectilinear motion. The cam 10 may be configured to have a plate shape having one side protruded to change a rotary motion to a rectilinear motion.

The cam 10 may be configured to have an oval or semi-oval shape. That is, the cam 10 may include a flat portion 11 and a protrusion portion 12. The shape of the cam 10 has a close relationship with a rotation angle of the driving shaft 17. In general, since a contact position and a noncontact position of the driving shaft 17 have an angle of 90 degrees therebetween, the cam 10 may be configured such that the flat portion 11 and the protrusion portion 12 have an angle of 90 degrees therebetween.

The cam 10 may be disposed such that the protrusion portion 12 faces a lower side when the ground switch 19 is in a closing state (contact position). The cam 10 may be coupled to the driving shaft 17 by a screw.

The cam 10 pushes the shaft 30 in an axial direction only when the ground switch 19 is in a contact state. That is, in a case where the ground switch 19 is in a noncontact position, the flat portion 11 is in contact with the one end 31 of the shaft 30 so that the cam 10 does not push the shaft 30, while in a case where the ground switch 19 is in a contact position, the protrusion portion 12 is in contact with the one end 31 of the shaft 30 so that the cam 10 may push the shaft 30. As such a procedure that the cam 10 pushes the shaft 30 has to be smoothly performed to avoid a mechanical abrasion and noise generation, it is preferred to form an outer surface of the cam 10 where the flat portion 11 and the protrusion portion 12 are connected to each other in a smooth curve.

The shaft 30 is provided to be moved linearly in an axial direction by the pressure of the cam 10. The shaft 30 is disposed to be spaced from the driving shaft 17 by a predetermined distance in a direction perpendicular thereto. The one end 31 of the shaft 30 is in contact with the cam 10. The shaft 30 is moved linearly by the pressure applied to the one end 31 thereof. According to the embodiments of the invention, there may be a gap between the cam 10 and the shaft 30 in a case where the flat portion 11 is placed toward the one end 31 of the shaft 31.

A contact plate 32 may be vertically coupled to the one end 31 of the shaft 30 in a direction perpendicular to an axial direction. The contact plate 32 may be coupled to the one end 31 by an insertion-coupling, adhesion, or welding. The contact plate 32 may be formed integrally at the one end 31 of the shaft 30 as one body. Under such a configuration that the contact plate 32 is provided to the one end 31 of the shaft 30, the shaft 30 may easily receive a contact pressure from the cam 10.

At a central portion of the shaft 30, a circumferential groove 33 is provided. Due to different of diameters of the shaft 30, the interlock plate 50 may be restricted to or released from the shaft 30. In a case where the interlock plate 50 is interlocked to the circumferential groove 33 of the shaft 30, the interlock plate 50 may be moved by being released from the restriction of the shaft 30, and in a case where the interlock plate 50 is engaged with the other portion, i.e. a large diameter portion of the shaft 30, the interlock plate 50 can not be moved due to the restriction of the shaft 30.

At another end 34 of the shaft 30, a fixing member 35 may be provided to fix the shaft 30. The fixing member 35 may be configured as a ring or a cap which has a hole corresponding to the diameter of the shaft 30. The fixing member 35 may be coupled to the shaft 30 by a screw. The fixing member 35 is useful to assemble especially in a case where the contact plate 32 is provided to the one end 31 of the shaft 30. That is, an assembling process may be easily performed by inserting the one end 34 of the shaft 30 into the supporter 20 and coupling the fixing member 35 to the supporter 20 at a lower side in an insertion manner.

The supporter 20 is provided to support the shaft 30 and ensure a stable movement of the shaft 30 as well. An insertion hole 21 is provided at a body of the supporter 20. In a case where the body of the supporter 20 is a pipe, the insertion hole 21 is commonly formed at the upper and lower parts of the body. At one side of the supporter 20, a coupling plate 22 may be extendedly formed. The supporter 20 may be fixed to front surface (in FIG. 4) of a side plate (not shown) of the power transformer room.

A spring 40 may be provided within the supporter 20 to return the shaft 30 when a contact pressure is not applied to the shaft 30 by the cam 10. The spring 40 is inserted around the shaft 30 and has one end fixed and supported to a lower surface of the body of the supporter 20 and another end supported by a key provided at the shaft 30. When the shaft 30 is moved downward by a contact pressure by the cam 10, the spring 40 is compressed to accumulate an elastic force, and in a case where the cam 10 is separated from the shaft 30, the shaft 30 is moved upward by the elastic force of the spring 40.

The interlock plate 50 is configured in a plate shape. One side of the interlock plate 50 is bent to form a coupling portion 51 which is fixed to the power transformer room door 16. At another side of the interlock plate 50, a hooking recess 52 is provided. The hooking recess 52 includes an inlet portion 52a and a hooking portion 52b. The inlet portion 52a is formed to have a width larger than a diameter of the circumferential groove 33 but smaller than a diameter of the shaft 30. Further, the interlock plate 50 is formed to have a length long enough for the hooking recess 52 to be engaged with the shaft 30 when the power transformer room door 16 is closed. Under such a configuration, in a case where the hooking portion 52b of the interlock plate 50 is engaged with a portion of the shaft 30 rather than the circumferential groove 33, the interlock plate 50 is not separated from the shaft 30, so that the power transformer room door 16 may not be opened, and in a case where the hooking portion 52b is engaged with the circumferential groove 33 of the shaft 30, the interlock plate 50 may be freely released from the shaft 30, so that the power transformer room door 16 may be opened.

An operation of the door interlock device for a power transformer room in accordance with an embodiment of the present invention will be described.

FIG. 4 is a partial perspective view illustrating a switch box of FIG. 3 in which the ground switch is opened, and FIG. 8 is a perspective view illustrating the door interlock device for a power transformer room in accordance with an embodiment of the present invention in which the ground switch is closed.

As shown in the drawings, in a case where the ground switch 19 is in an open state (i.e., a non-grounded state), the flat portion 11 of the cam 10 is in contact with the contact plate 32 of the shaft 30. Thus, since the interlock plate 50 is interlocked with the shaft 30, the power transformer room door 16 is not opened.

In a case where the ground switch 19 is in a closed state (i.e., in a grounded state), the protrusion portion 12 of the cam 10 is in contact with the contact plate 32 of the cam 10 to thus push the shaft 30 downward. Thus the circumferential groove 33 of the cam 10 is placed at the hooking recess 33 of the interlock plate 50 so that the interlock plate 50 may be released from the shaft 30. Accordingly, the power transformer room door can be opened.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A door interlock device of a vacuum circuit breaker in a power transformer room, the interlock device comprising:
   a ground switch including a shaft, a cam located on the shaft of the ground switch;
   a supporter located on a side plate;
   a slidable shaft located at the supporter and including a first end contacting the cam such that the slidable shaft is movable upward and downward;
   a spring located within the supporter to provide an upward elastic force to the slidable shaft; and an interlock plate located at one side of a door of the power transformer room and configured to contact the slidable shaft, wherein:

the cam includes a groove that is coupled to the shaft of the ground switch;

the groove includes a screw groove, the cam is located on an extended line of a length direction of the slidable shaft;

the slidable shaft includes a circumferential groove at a central portion and a fixing member at a second end, the fixing member fixing the slidable shaft to the supporter;

the fixing member is a ring or a cap that corresponds to a diameter of the slidable shaft;

an outer diameter of the fixing member is larger than a diameter of the slidable shaft;

the spring is inserted around the slidable shaft and has a first end fixed and supported by a lower surface of a body of the supporter and a second end supported by a key provided at the slidable shaft;

the slidable shaft further includes a hole into which a key is inserted;

the interlock plate includes a hooking recess that engages the circumferential groove;

the hooking recess includes a hooking portion having a width equal to or larger than the diameter of the slidable shaft and an inlet portion having a width larger than a diameter of the circumferential groove but smaller than the diameter of the slidable shaft;

the door is prevented from moving when the ground switch is in an open position and the interlock plate is restricted by the slidable shaft; and the door is allowed to move when the ground switch is in a closed position and the interlock plate is not restricted by the slidable shaft.

2. The device of claim 1, wherein the slidable shaft further includes a contact plate at the first end in a direction perpendicular to an axial direction such that the contact plate contacts the cam.

3. The device of claim 1, wherein:

the cam further includes a flat portion and a protrusion portion; and the protrusion portion contacts the slidable shaft only when the ground switch is in the closed position.

* * * * *